US012731557B2

(12) United States Patent
Koyama et al.

(10) Patent No.: US 12,731,557 B2
(45) Date of Patent: Sep. 8, 2026

(54) LIQUID CRYSTAL DISPLAY DEVICE, MANUFACTURING METHOD FOR LIQUID CRYSTAL DISPLAY DEVICE, AND ELECTRONIC APPARATUS

(71) Applicant: SEIKO EPSON CORPORATION, Tokyo (JP)

(72) Inventors: Kohei Koyama, Matsumoto (JP); Kazuhisa Mizusako, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/093,957

(22) Filed: Mar. 28, 2025

(65) Prior Publication Data

US 2025/0308479 A1 Oct. 2, 2025

(30) Foreign Application Priority Data

Mar. 29, 2024 (JP) ................................ 2024-055577

(51) Int. Cl.
*G09G 3/36* (2006.01)

(52) U.S. Cl.
CPC ... *G09G 3/3648* (2013.01); *G09G 2320/0276* (2013.01)

(58) Field of Classification Search
CPC ...... G09G 3/007; G09G 3/002; G09G 3/3688; G09G 3/3614; G09G 3/3648
See application file for complete search history.

(56) References Cited

U.S. PATENT DOCUMENTS

| | | | | |
|---|---|---|---|---|
| 6,819,359 B1 * | 11/2004 | Oda | H04N 25/68 348/E5.081 |
| 12,437,688 B1 * | 10/2025 | Komuro | G09G 3/2007 |
| 2006/0066533 A1 * | 3/2006 | Sato | G09G 3/20 345/76 |
| 2011/0205439 A1 * | 8/2011 | Iisaka | G09G 3/3648 348/E5.077 |
| 2011/0254878 A1 * | 10/2011 | Mori | G09G 3/2007 345/690 |
| 2016/0125817 A1 * | 5/2016 | Mizusako | G09G 3/003 345/89 |
| 2017/0025084 A1 * | 1/2017 | Mizusako | G09G 3/3655 |
| 2017/0316727 A1 * | 11/2017 | Mizusako | G09G 3/3677 |

(Continued)

FOREIGN PATENT DOCUMENTS

| | | |
|---|---|---|
| JP | 2011-170235 A | 9/2011 |
| JP | 2021-004919 A | 1/2021 |

*Primary Examiner* — Van N Chow
(74) *Attorney, Agent, or Firm* — Oliff PLC

(57) ABSTRACT

First correction is performed on each piece of pixel data based on a gradation level of a panel pixel around each piece of pixel data, a boundary at which a bright panel pixel, and a dark panel pixel, are adjacent to each other is detected, when there is a first boundary at which the gradation level of the bright panel pixel being a bright panel pixel related to the detected boundary and subjected to the first correction is equal to or higher than a third threshold value, in a first bright panel pixel and a first dark panel pixel adjacent to each other via the first boundary, second correction for bringing the gradation level of the first bright panel pixel close to a first threshold value and bringing the gradation level of the first dark panel pixel close to the second threshold value is performed.

6 Claims, 6 Drawing Sheets

(56) References Cited

U.S. PATENT DOCUMENTS

| | | | | |
|---|---|---|---|---|
| 2021/0125571 | A1* | 4/2021 | Aoki | G09G 3/3607 |
| 2024/0331600 | A1* | 10/2024 | Aoki | G09G 3/007 |
| 2025/0140142 | A1* | 5/2025 | Mizusako | G09G 3/007 |
| 2025/0246106 | A1* | 7/2025 | Osachi | H04N 9/3188 |

* cited by examiner

| | | | | | | |
|---|---|---|---|---|---|---|
| 0.000 | 0.001 | 0.004 | 0.005 | 0.004 | 0.001 | 0.000 |
| 0.001 | 0.009 | 0.022 | 0.029 | 0.022 | 0.009 | 0.001 |
| 0.004 | 0.022 | 0.055 | 0.073 | 0.055 | 0.022 | 0.004 |
| 0.005 | 0.029 | 0.073 | 0.100 | 0.073 | 0.029 | 0.005 |
| 0.004 | 0.022 | 0.055 | 0.073 | 0.055 | 0.022 | 0.004 |
| 0.001 | 0.009 | 0.022 | 0.029 | 0.022 | 0.009 | 0.001 |
| 0.000 | 0.001 | 0.004 | 0.005 | 0.004 | 0.001 | 0.000 |
FIG. 10
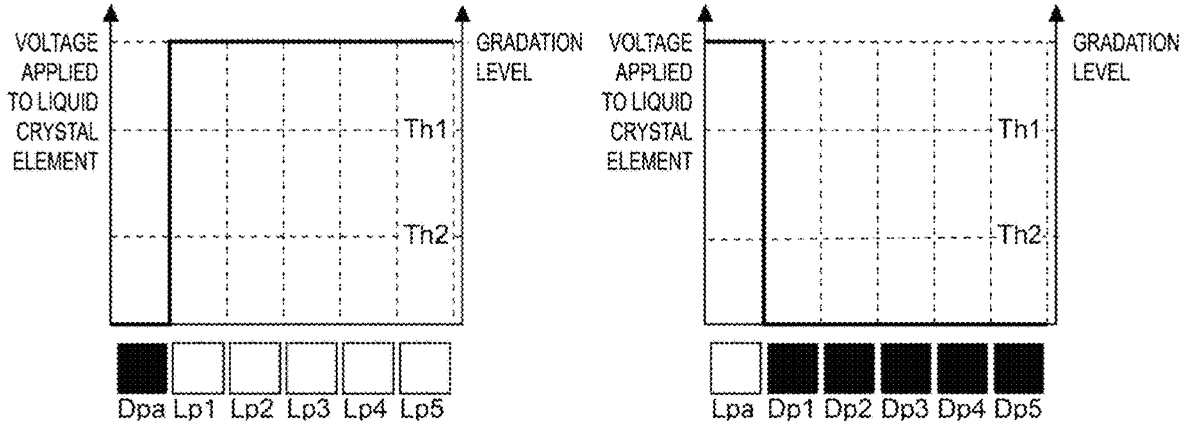
FIG. 11
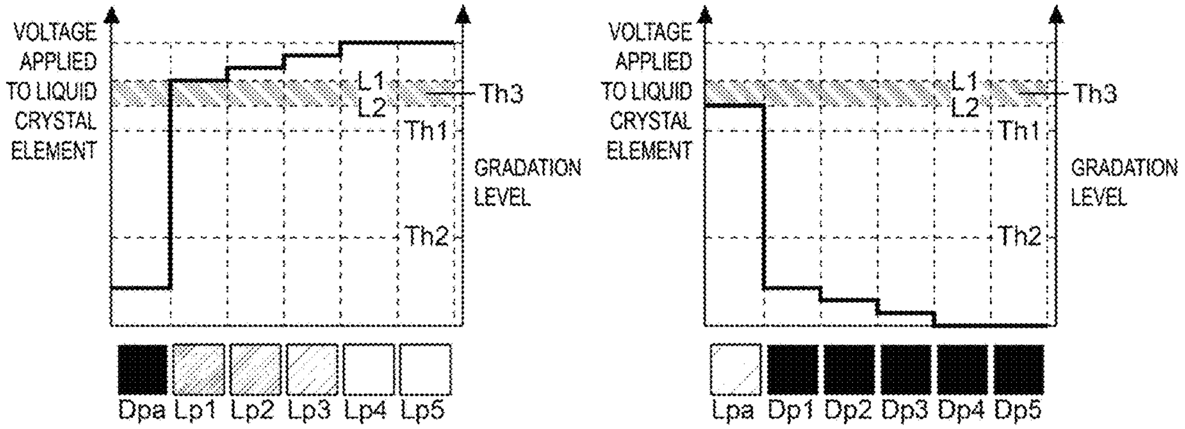
FIG. 12

LIQUID CRYSTAL DISPLAY DEVICE, MANUFACTURING METHOD FOR LIQUID CRYSTAL DISPLAY DEVICE, AND ELECTRONIC APPARATUS

The present application is based on, and claims priority from JP Application Serial Number 2024-055577, filed Mar. 29, 2024, the disclosure of which is hereby incorporated by reference herein in its entirety.

BACKGROUND

1. Technical Field

The disclosure relates to a liquid crystal display device, a control method for the liquid crystal display device, and an electronic apparatus.

2. Related Art

As liquid crystal panels have become smaller and higher in definition in recent years and a gap between pixel electrodes has become narrower, an influence of an electric field generated between adjacent pixel electrodes, that is, an electric field in a direction parallel to a substrate surface (horizontal electric field) has not been able to be ignored. Specifically, the horizontal electric field causes poor alignment of liquid crystal, that is, a domain, which is visually recognized as a display defect.

For this reason, when it is expected that a horizontal electric field will become strong and a display problem occurs due to a domain, a technique for correcting video data supplied from an upper device to perform correction so that a difference between voltages applied to adjacent pixel electrodes is reduced has been proposed. Such a type of correction is referred to as a domain correction (see, for example, a description in JP-A-2011-170235).

However, in the technique described above, there is a problem in that a phenomenon referred to as so-called black floating occurs when domain correction is performed.

SUMMARY

To solve the problem described above, a projection-type display device according to an aspect of the present disclosure includes a liquid crystal panel including panel pixels, and a display control circuit configured to control the liquid crystal panel, in which video data includes pixel data corresponding to the panel pixels, and the pixel data designates gradation levels of the panel pixels. The display control circuit is configured to perform first correction on each piece of pixel data included in the video data based on a gradation level of gradation data of a panel pixel around each piece of pixel data, detect a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other, when there is a first boundary at which the gradation level designated by the pixel data of the bright panel pixel being a bright panel pixel related to the detected boundary and subjected to the first correction is equal to or higher than a third threshold value, in a first bright panel pixel and a first dark panel pixel adjacent to each other via the first boundary, perform second correction for bringing the gradation level designated by the pixel data of the first bright panel pixel subjected to the first correction close to the first threshold value and bringing the gradation level designated by the pixel data of the first dark panel pixel subjected to the first correction close to the second threshold value, and supply a data signal corresponding to the corrected gradation level to the panel pixel.

To solve the problem described above, a projection-type display device according to another aspect of the present disclosure includes a liquid crystal panel including panel pixels, and a display control circuit configured to control the liquid crystal panel, in which video data includes pixel data corresponding to the panel pixels, and the pixel data designates gradation levels of the panel pixels. The display control circuit is configured to detect a boundary at which a bright panel pixel, of which the gradation level designated by the pixel data included in the video data is equal to or higher than a first threshold value, and a dark panel pixel, of which the gradation level is equal to or lower than a second threshold value, are adjacent to each other, and when a first boundary and a second boundary are detected as the boundary, dark panel pixels and bright panel pixels, of which the number is larger than the number of the dark panel pixels, are adjacent to each other at the first boundary, and dark panel pixels and bright panel pixels, of which the number is smaller than the number of the dark panel pixels, are adjacent to each other at the second boundary, make an amount of correction for the pixel data of the bright panel pixels related to the first boundary smaller than an amount of correction for the pixel data of the bright panel pixels related to the second boundary, and make an amount of correction for the pixel data of the dark panel pixels related to the first boundary larger than an amount of correction for the pixel data of the dark panel pixels related to the second boundary.

To solve the problem described above, a control method for a projection-type liquid crystal display device according to another aspect of the present disclosure is a control method for the projection-type liquid crystal display device including a liquid crystal panel including panel pixels, and a display control circuit configured to control the liquid crystal panel, in which video data includes pixel data corresponding to the panel pixels, and the pixel data designates gradation levels of the panel pixels. The control method includes, by the display control circuit, performing first correction on each piece of pixel data included in the video data based on a gradation level of gradation data of a panel pixel around each piece of pixel data, detecting a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other, when there is a first boundary at which the gradation level designated by the pixel data of the bright panel pixel being a bright panel pixel related to the detected boundary and subjected to the first correction is equal to or higher than a third threshold value, in a first bright panel pixel and a first dark panel pixel adjacent to each other via the first boundary, performing second correction for bringing the gradation level designated by the pixel data of the first bright panel pixel subjected to the first correction close to the first threshold value and bringing the gradation level designated by the pixel data of the first dark panel pixel subjected to the first correction close to the second threshold value, and supplying a data signal corresponding to the corrected gradation level to the panel pixel.

BRIEF DESCRIPTION OF THE DRAWINGS

FIG. 10 is a diagram showing an example of a coefficient matrix of a filter processing circuit in the processing circuit.

FIG. 11 is a diagram showing an example of a change in gradation level.

FIG. 12 is a diagram showing an example of a change in gradation level.

DESCRIPTION OF EMBODIMENTS

Hereinafter, a liquid crystal display device according to an embodiment will be described with reference to the drawings. In each drawing, dimensions and scales of respective portions are appropriately different from actual ones. Further, since embodiments to be described below are preferred specific examples, various technically preferable limitations are applied, but the scope of the present disclosure is not limited to these embodiments unless it is otherwise stated in the following description that the present disclosure is limited.

Figure 1:
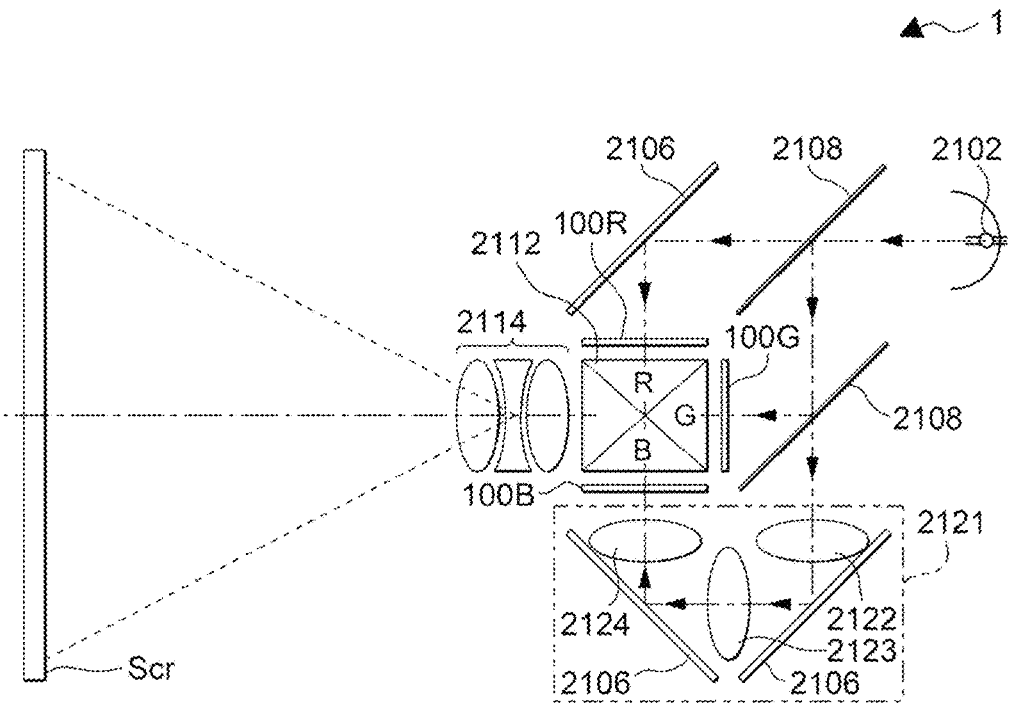
FIG. 1 is a diagram showing a projection-type display device to which a liquid crystal panel according to an embodiment is applied.

FIG. 1 is a diagram showing an optical configuration of a projection-type display device 1 to which a liquid crystal panel according to an embodiment is applied. As shown in the drawing, the projection-type display device 1 includes liquid crystal panels 100R, 100G, and 100B. Further, a lamp unit 2102 including a white light source such as a halogen lamp is provided inside the projection-type display device 1. Projection light emitted from the lamp unit 2102 is separated into three primary colors of red (R), green (G), and blue (B) by three mirrors 2106 and two dichroic mirrors 2108 disposed inside. Of these, the R light is incident on the liquid crystal panel 100R, the G light is incident on the liquid crystal panel 100G, and the B light is incident on the liquid crystal panel 100B.

Since an optical path of B is longer than optical paths of R and G, it is necessary to prevent a loss in the optical path of B. For this reason, a relay lens system 2121 including an incident lens 2122, a relay lens 2123, and an emission lens 2124 is provided in the optical path of B.

The liquid crystal panel 100R includes pixel circuits arranged in a matrix, as described below. The transmittance of light emitted from the liquid crystal element in the pixel circuit is controlled based on a data signal corresponding to R. That is, in the liquid crystal panel 100R, the light emitted from the liquid crystal element functions as a smallest unit of an image. Under such control, the liquid crystal panel 100R generates an R transmitted image based on a data signal corresponding to R. Similarly, the liquid crystal panel 100G generates a G transmitted image based on a data signal corresponding to G, and the liquid crystal panel 100B generates a B transmitted image based on a data signal corresponding to B.

The transmitted images of respective colors generated by the liquid crystal panels 100R, 100G, and 100B are incident on a dichroic prism 2112 from three directions. In the dichroic prism 2112, the R light and the B light are refracted at 90 degrees, while the G light travels straight. The dichroic prism 2112 therefore combines the images of the respective colors. The image combined by the dichroic prism 2112 is incident on a projection lens 2114. The projection lens 2114 enlarges and projects the combined image formed by the dichroic prism 2112 onto a screen Scr.

The images transmitted by the liquid crystal panels 100R and 100B are projected after being reflected by the dichroic prism 2112, whereas the image transmitted by the liquid crystal panel 100G is projected in a straight line. Thus, the images transmitted by the liquid crystal panels 100R and 100B are in a left-right inverted relationship with the image transmitted by the liquid crystal panel 100G.

Figure 2:
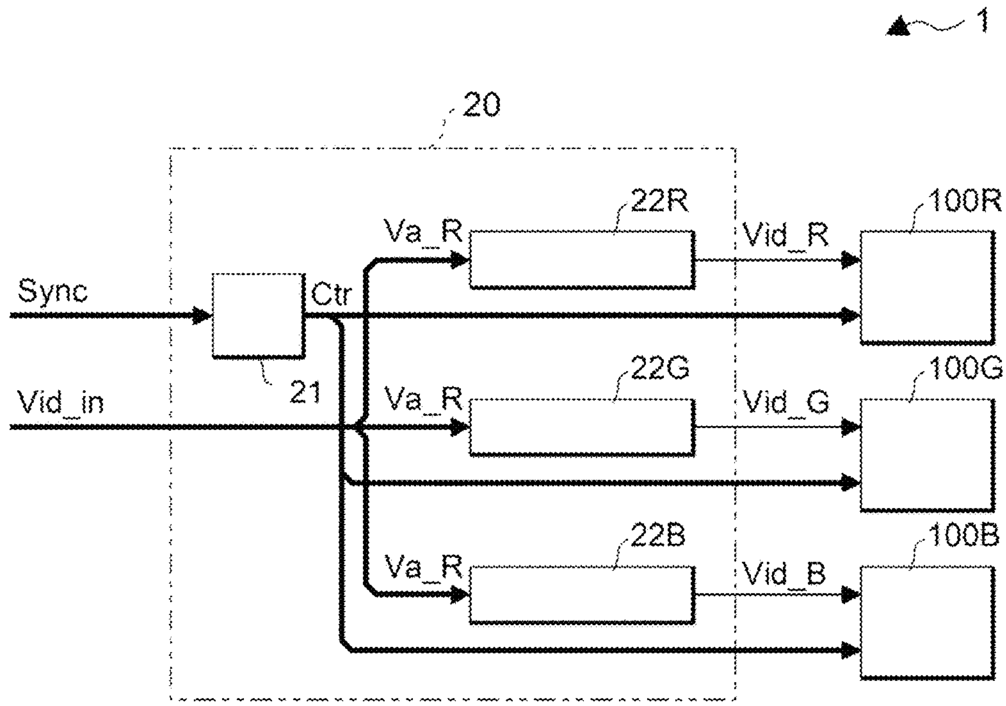
FIG. 2 is a block diagram showing a configuration of the projection-type display device.

FIG. 2 is a block diagram showing an electrical configuration of the projection-type display device 1. As shown in the drawing, the projection-type display device 1 includes a display control circuit 20, and the above-described liquid crystal panels 100R, 100G, and 100B.

Video data Vid_in is supplied to the display control circuit 20 in synchronization with a synchronization signal Sync from an upper device such as a host device (not shown). The video data Vid_in is data indicating an image to be displayed on the projection-type display device 1, and in detail, a gradation level of a pixel of the image is designated, for example, by 8 bits for each of RGB.

The pixel of the image designated by the video data Vid_in is referred to as a video pixel, and data for designating the gradation level of the video pixel is referred to as pixel data, but the video pixel and the pixel data may not be particularly distinguished from each other in the description. Further, a pixel before or after the combination using the liquid crystal panel 100R, 100G, or 100B is referred to as a panel pixel. When the video pixels and the panel pixels correspond to each other on a one to-one basis as in the present embodiment, it is not particularly necessary to distinguish between video pixels and panel pixels.

The synchronization signal Sync includes a vertical synchronization signal for instructing the start of vertical scanning in the video data Vid_in, a horizontal synchronization signal for instructing the start of horizontal scanning, and a clock signal indicating a timing for one pixel of the video data.

In the present embodiment, the color image projected onto the screen Scr is expressed by superimposing the respective transmitted images of the liquid crystal panels 100R, 100G, and 100B. Thus, pixels, which are smallest units of a color image, can be divided into a red panel pixel of the liquid crystal panel 100R, a green panel pixel of the liquid crystal panel 100G, and a blue panel pixel of the liquid crystal panel 100B.

Strictly speaking, the red panel pixel, the green panel pixel, and the blue panel pixel should be referred to as subpixels, but are referred to as panel pixels as described above in the present description.

The display control circuit 20 includes a control circuit 21, and processing circuits 22R, 22G, and 22B.

The control circuit 21 generates a control signal Ctr for controlling the liquid crystal panels 100R, 100G and 100B.

Details of the processing circuits 22R, 22G and 22B will be described later, but the processing circuit 22R processes R-component video data Va_R from the video data Vid_in, converts it into an analog data signal Vid_R and supplies it to the liquid crystal panel 100R.

Similarly, the processing circuit 22G processes G-component video data Va_G from the video data Vid_in, converts it into an analog data signal Vid_G and supplies it to the liquid crystal panel 100G. The processing circuit 22B processes B-component video data Va_B from the video data Vid_in, converts it into an analog data signal Vid_B and supplies it to the liquid crystal panel 100B.

A liquid crystal display device is conceptualized by the liquid crystal panel 100R, 100G or 100B and the processing circuit for supplying a data signal to the liquid crystal panel.

Next, the liquid crystal panels 100R, 100G, and 100B will be described. The liquid crystal panels 100R, 100G, and 100B are structurally the same, with only color, that is, wavelength, of incident light being different. Consequently, the liquid crystal panels 100R, 100G, and 100B will be generally described with reference numeral 100 without specifying the color.

Figure 3:
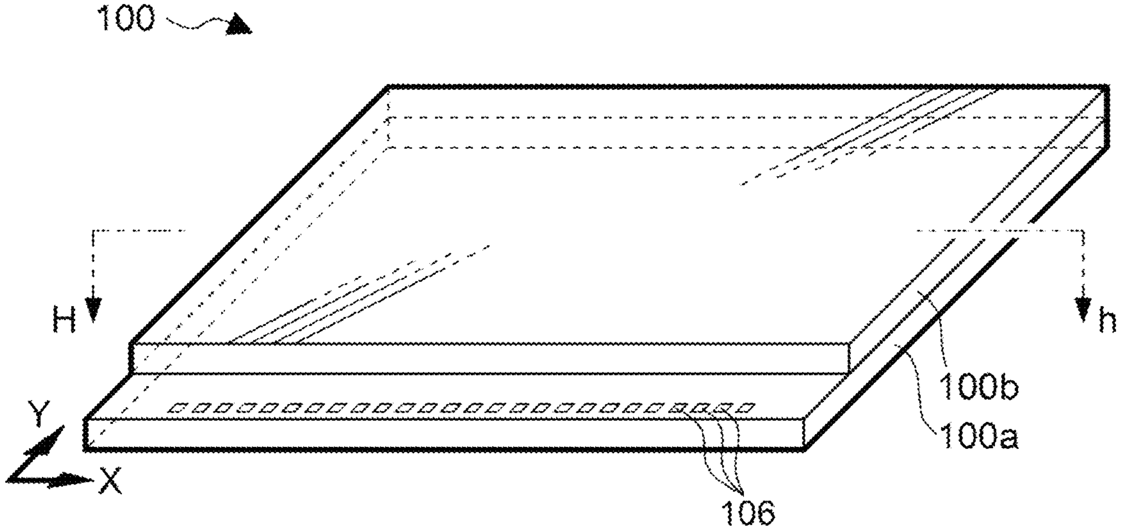
FIG. 3 is a perspective view showing a configuration of a liquid crystal panel of the projection-type display device.
Figure 4:
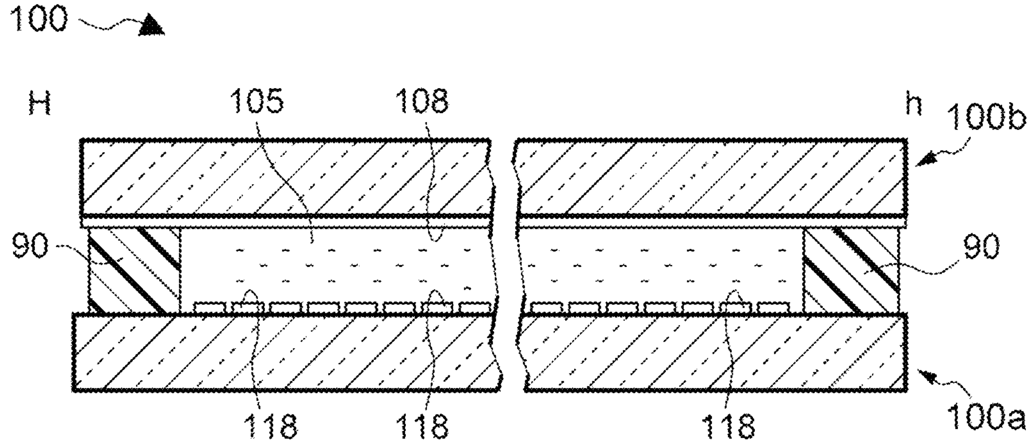
FIG. 4 is a cross-sectional view showing a structure of the liquid crystal panel.

FIG. 3 is a diagram showing a main portion of the liquid crystal panel 100, and FIG. 4 is a cross-sectional view taken along line H-h in FIG. 3.

As shown in these drawings, in the liquid crystal panel 100, an element substrate 100*a* having pixel electrodes 118 provided thereon and a counter substrate 100*b* having a common electrode 108 provided thereon are bonded together by a seal material 90 so that electrode formation surfaces face each other while maintaining a certain gap, and this gap is sealed with a liquid crystal 105.

As the element substrate 100*a* and the counter substrate 100*b*, a light-transmitting substrate such as glass or quartz may be used. As shown in FIG. 3, one side of the element substrate 100*a* protrudes from the counter substrate 100*b*. In this protruding area, a plurality of terminals 106 are provided in a horizontal direction in the drawing. One end of a flexible printed circuit (FPC) substrate (not illustrated) is coupled to the plurality of terminals 106. The other end of the FPC substrate is coupled to the display control circuit 20, and the above-described various signals are supplied.

On the surface of the element substrate 100*a* which faces the counter substrate 100*b*, the pixel electrodes 118 are formed by patterning a transparent conductive layer such as an Indium Tin Oxide (ITO).

Figure 5:
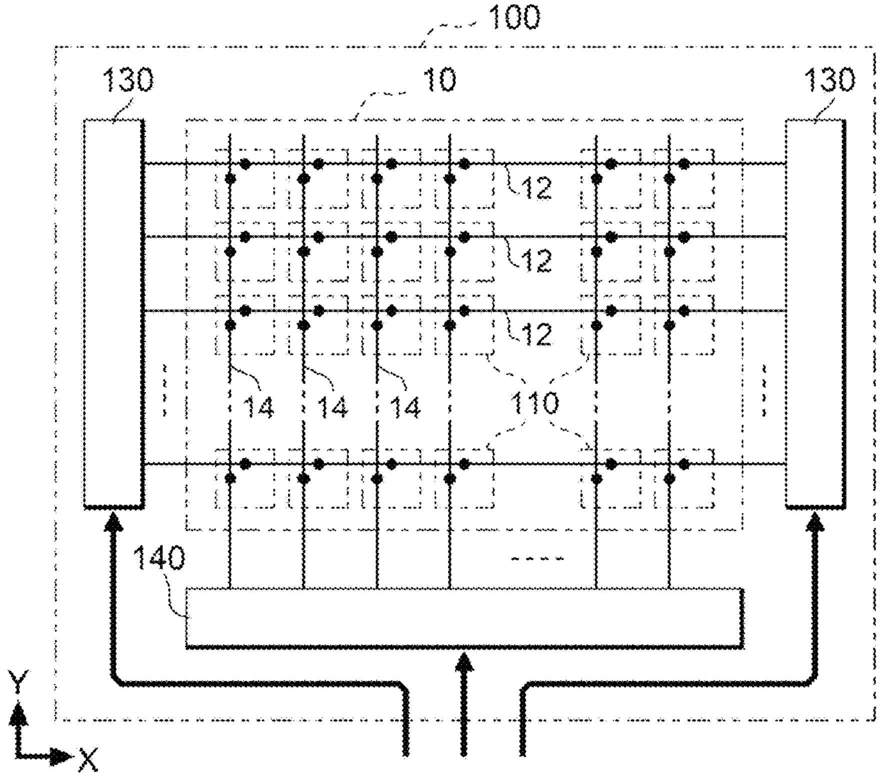
FIG. 5 is a block diagram showing an electrical configuration of the liquid crystal panel.

FIG. 5 is a block diagram showing an electrical configuration of the liquid crystal panel 100. The liquid crystal panel 100 is provided with a scanning line driving circuit 130 and a data line driving circuit 140 on a periphery of the display area 10.

In the display area 10 of the liquid crystal panel 100, pixel circuits 110 are arranged in a matrix. In detail, in the display area 10, a plurality of scanning lines 12 are provided to extend in a horizontal X direction in the drawing, and a plurality of data lines 14 are provided to extend in a vertical Y direction and to be electrically insulated from the scanning lines 12. The pixel circuits 110 are provided in a matrix to correspond to intersections between the plurality of scanning lines 12 and the plurality of data lines 14.

When the number of scanning lines 12 is m and the number of data lines 14 is n, the pixel circuits 110 are arranged in a matrix of m vertical rows and n horizontal columns. Both m and n are integers equal to or greater than 2. In the scanning lines 12 and the pixel circuits 110, the rows of the matrix may be referred to as 1st, 2nd, 3rd, . . . , (m−1)-th, and m-th rows in order from the top in the drawing in order to distinguish between the rows of the matrix. Similarly, in the data lines 14 and the pixel circuits 110, the columns of the matrix may be referred to as 1st, 2nd, 3rd, . . . , (n−1)-th, and n-th columns in order from the left in the drawing in order to distinguish between the columns of the matrix.

The scanning line driving circuit 130 selects the scanning lines 12 one by one in order of, for example, the first, second, third, . . . , m-th rows under the control of the display control circuit 20, and sets a scanning signal to the selected scanning line 12 to an H level. The scanning line driving circuit 130 sets a scanning signal to the scanning lines 12 other than the selected scanning line 12 to an L level.

The data line driving circuit 140 latches a data signal for one row supplied from the circuit for corresponding color among the processing circuits 22R, 22G, and 22B, and outputs the data signal to the pixel circuit 110 located on the scanning line 12 via the data line 14 during a period in which the scanning signal to the scanning lines 12 is at the H level.

Figure 6:
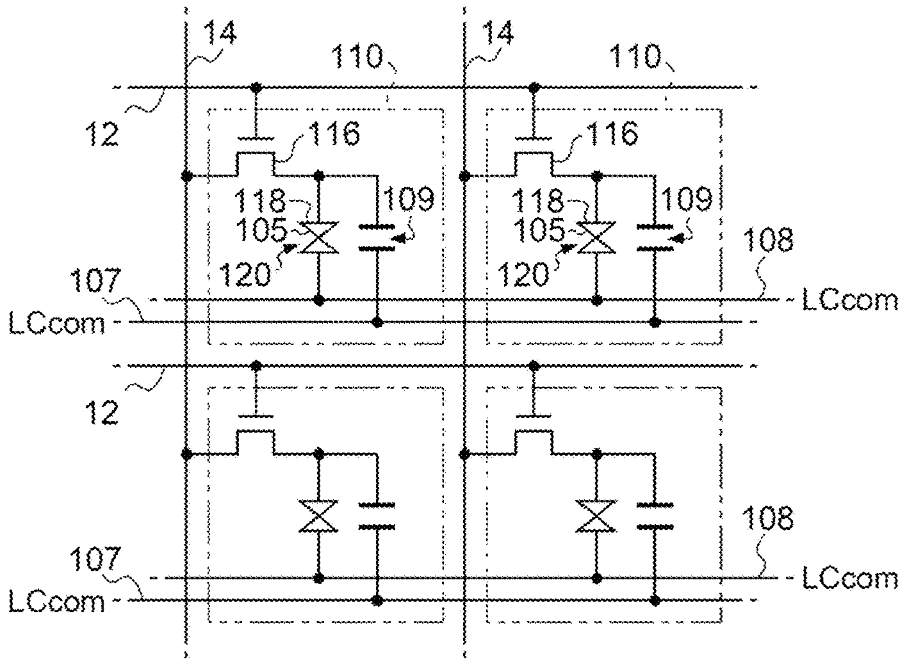
FIG. 6 is a diagram showing a configuration of a pixel circuit of the liquid crystal panel.

FIG. 6 is a diagram showing an equivalent circuit of a total of four of the pixel circuits 110, in two rows and two columns, corresponding to the intersections between two adjacent scanning lines 12 and two adjacent data lines 14.

As shown in the drawing, the pixel circuit 110 includes a transistor 116 and a liquid crystal element 120. The transistor 116 is, for example, an n-channel thin film transistor. In the pixel circuit 110, the transistor 116 has a gate node coupled to the scanning line 12, a source node coupled to the data line 14, and a drain node coupled to the pixel electrode 118 having a substantially square shape in a plan view.

The common electrode 108 is provided in common to all of the pixels to face the pixel electrode 118. A voltage LCcom is applied to the common electrode 108. As described above, the liquid crystal 105 is sandwiched between the pixel electrodes 118 and the common electrode 108. Thus, the liquid crystal element 120 in which the liquid crystal 105 is sandwiched between the pixel electrodes 118 and the common electrode 108 is formed in each pixel circuit 110.

Further, a storage capacitor 109 is provided in parallel with the liquid crystal element 120. The storage capacitor 109 has one end coupled to the pixel electrode 118, and the other end coupled to a capacitance line 107. A voltage that is constant over time such as the voltage LCcom that is the same as the voltage applied to the common electrode 108 is applied to the capacitance line 107. Since the pixel circuits 110 are arranged in a matrix in the X direction, which is a direction in which the scanning lines 12 extend, and the Y direction, which is a direction in which the data lines 14 extend, the pixel electrodes 118 included in the pixel circuits 110 are also arranged in the X and Y directions.

In the scanning line 12 on which the scanning signal is set to be at the H level, the transistor 116 of the pixel circuit 110 provided to correspond to the scanning line 12 is set to be in an on state. When the transistor 116 is set to be in an on state, the data line 14 and the pixel electrode 118 are electrically coupled to each other, and thus, the data signal supplied to the data line 14 reaches the pixel electrode 118 via the transistor 116 that is set to be in an on state. When the scanning line 12 is set to be at the L level, the transistor 116 is set to be in an off state, but a voltage of the data signal that has reached the pixel electrode 118 is maintained by a capacitance of the liquid crystal element 120 and the storage capacitor 109.

As is well known, in the liquid crystal element 120, the orientation of liquid crystal molecules changes depending on an electric field generated by the pixel electrode 118 and the common electrode 108. Thus, the liquid crystal element 120 has a transmittance corresponding to an effective value of an applied voltage.

A region of the liquid crystal element 120 that functions as a panel pixel, that is, a region of a transmittance corresponding to the effective value of the voltage is a region where the pixel electrode 118 and the common electrode 108 overlap each other when the element substrate 100*a* and the counter substrate 100*b* are viewed in a plan view. Since the pixel electrode 118 is substantially square in a plan view, the shape of the pixel in the liquid crystal panel 100 is also substantially square.

Further, in the present embodiment, the liquid crystal 105 is of a vertical alignment (VA) type, and is in a normally black mode in which a transmittance is lowest when a voltage applied to the liquid crystal element 120 is zero, and increases as the applied voltage increases.

An operation of supplying the data signal to the pixel electrode 118 of the liquid crystal element 120 is performed in order of the first, second, third, . . . and m-th rows in each horizontal scanning period. Thereby, a voltage corresponding to the data signal is held in each of the liquid crystal elements 120 of the pixel circuits 110 arranged in the m rows and the n columns, each liquid crystal element 120 has a desired transmittance, and a transmitted image of the corresponding color is generated by the liquid crystal elements 120 arranged in the m rows and the n columns.

Thus, the generation of a transmitted image is executed for each RGB, and a color image obtained by combining RGB is projected onto the screen Scr.

Here, the domain in the liquid crystal panel 100 will be described.

Figure 7:
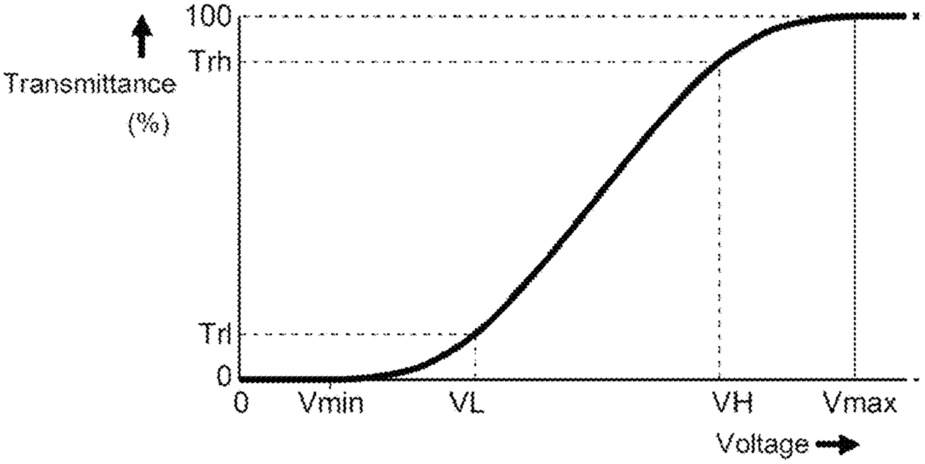
FIG. 7 is a diagram showing an example of a V-T characteristic of a liquid crystal element.

FIG. 7 is a diagram showing an example of applied voltage-transmittance characteristics (V-T characteristics) of the liquid crystal element 120 in a normally black mode.

In the normally black mode, a high gradation level is designated and a panel pixel with a high transmittance (bright panel pixel) has a high voltage applied to the liquid crystal element 120. On the other hand, a low gradation level is designated and a panel pixel with a low transmittance (dark panel pixel) has a low voltage applied to the liquid crystal element 120.

For convenience, such a bright panel pixel and dark panel pixel are defined as follows.

The bright panel pixel is a panel pixel in which a voltage applied to the liquid crystal element 120 is equal to or higher than VH and a transmittance is Trh. The dark panel pixel is a panel pixel in which a voltage applied to the liquid crystal element 120 is equal to or less than VL and a transmittance is Trl.

Here, VH and VL have a relationship of VH>VL.

When a voltage applied to the liquid crystal element 120 is VH, a gradation level designated by pixel data of the panel pixel is a first threshold value to be described later. When a voltage applied to the liquid crystal element 120 is VL, a gradation level designated by pixel data of the panel pixel is a second threshold value to be described later.

In other words, when a gradation level is equal to or higher than the first threshold value, a voltage applied to the liquid crystal element 120 is equal to or higher than VH, and the panel pixel of the liquid crystal element 120 becomes a bright panel pixel. When a gradation level is equal to or lower than the second threshold value, a voltage applied to the liquid crystal element 120 is equal to or lower than VL, and the panel pixel of the liquid crystal element 120 becomes a dark panel pixel.

Figure 8:
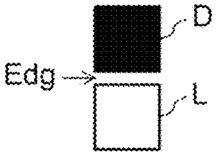
FIG. 8 is a diagram showing a domain in the liquid crystal panel.

As shown in FIG. 8, in the liquid crystal panel 100, when a panel pixel L having a high transmittance, that is, a high voltage applied to the liquid crystal element 120, and a panel pixel D having a low transmittance, that is, a low voltage applied to the liquid crystal element 120, are adjacent to each other, a voltage difference between the pixel electrodes 118 becomes large, and a lateral electric field generated in a direction along the substrate surface becomes large, making it easy to cause a phenomenon in which the orientation of liquid crystal molecules becomes disturbed near a boundary Edge between two panel pixels, that is, cause a domain.

In general, when the voltage difference between the pixel electrodes 118 becomes larger, the degree of a domain occurring near a boundary between two adjacent panel pixels increases. The panel pixels causing the domain do not have a transmittance corresponding to a gradation level, which causes a decrease in display quality.

Thus, when considering only curbing a display defect caused by a domain, when a panel pixel L with a high applied voltage and a panel pixel D with a low applied voltage are expected to be adjacent to each other, a horizontal electric field generated in the pixel electrode 118 of the panel pixel L and the pixel electrode 118 of the panel pixel D should be corrected to be reduced.

In such a simple correction, the same processing is executed in the case of a boundary where the number of bright panel pixels L is larger than the number of dark panel pixels D and in the case of a boundary where the number of dark panel pixels D is larger than the number of bright panel pixels L, and thus the following defect occurs.

That is, in the case of the boundary where the number of dark panel pixels D is larger than the number of bright panel pixels L, when the correction is performed excessively strongly, contradiction such as black floating occurs due to the correction, and thus it is necessary to reduce the amount of correction not to affect the entire display quality. On the other hand, when the amount of correction is reduced, there is a problem in that the correction for the boundary where the number of bright panel pixels L is larger than the number of dark panel pixels D is weakened.

Here, the black floating is a phenomenon in which a panel pixel becomes brighter than a transmittance designated by a gradation level and is visually recognized as if black is floating.

In FIG. 8, the bright panel pixel L and the dark panel pixel D are merely used for description, and are irrelevant to a bright panel pixel Lp and a dark panel pixel Dp described in FIG. 7.

In the present embodiment, the processing circuits 22R, 22G, and 22B execute the following correction in order to curb a domain while curbing black floating. Since the processing circuits 22R, 22G, and 22B execute the same correction, the processing circuit 22R will be described as a representative.

As a first process, the processing circuit 22R smooths the gradation level of a pixel designated by pixel data of the R-component video data Va_R in the video data Vid_in. The smoothing of the gradation level is a process of reducing a difference between the gradation levels of adjacent panel pixels.

As a second process, after the smoothing, the processing circuit 22R detects a boundary at which a bright panel pixel having a gradation level equal to or higher than a first threshold value and a dark panel pixel having a gradation level equal to or lower than a second threshold value are adjacent to each other in the X direction or the Y direction.

As a third process, the processing circuit 22R determines whether the gradation level of a bright panel pixel related to the detected boundary is equal to or higher than a third threshold value. The panel pixels related to the boundary are bright panel pixels or dark panel pixels adjacent to each other with the boundary interposed therebetween.

As a fourth process, when the gradation level of the bright panel pixel related to the detected boundary is equal to or higher than the third threshold value, the processing circuit 22R performs correction for bringing the gradation level of the bright panel pixel related to the boundary closer to the first threshold value and bringing the gradation level of the dark panel pixel related to the boundary closer to the second threshold value.

On the other hand, when the gradation levels of the panel pixel not related to the boundary and the bright panel pixel related to the boundary are less than the third threshold value, the processing circuit 22R outputs the smoothed gradation level as it is for the panel pixel related to the boundary as a fifth process.

As a sixth process, the processing circuit 22R converts the gradation level having been subjected to the fourth process or the fifth process into an analog signal Vid_R and supplies it to the liquid crystal panel 100R.

The processing circuit 22G also converts the G-component video data Va_G into an analog data signal Vid_G through a similar process and supplies it to the liquid crystal panel 100G. The processing circuit 22B also converts the B-component video data Va_B into an analog data signal Vid_B through a similar process and supplies it to the liquid crystal panel 100B.

The third threshold value will be described later in FIG. 12 or FIG. 13.

Next, specific examples of the processing circuits 22R, 22G and 22B that execute such correction will be described.

Figure 9:
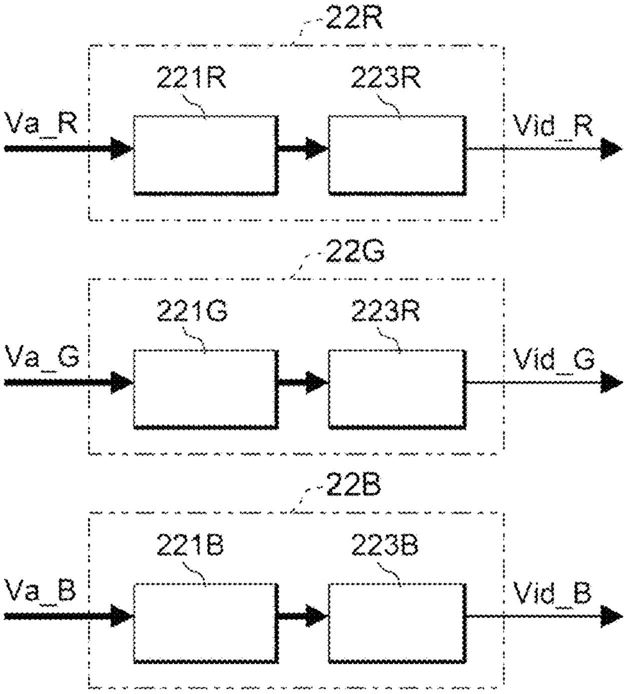
FIG. 9 is a diagram showing an example of a processing circuit in the embodiment.

FIG. 9 is a block diagram showing configurations of the processing circuits 22R, 22G, and 22B.

As shown in this drawing, the processing circuit 22R includes a low-pass filter 221R and a correction circuit 223R. The low-pass filter 221R smooths the gradation level designated by the pixel data configuring the R-component video data Va_R of the video data Vid_in, that is, executes the first process described above.

The smoothing of the gradation level is executed by using, for example, a coefficient matrix of a filter as shown in FIG. 10.

The coefficient matrix of the filter shown in FIG. 10 means that, when focusing on one video image in an array of video pixels that configure video data Va_R, if the gradation level of the focused video pixel is higher than the gradation levels of the surrounding video pixels, the gradation level of the focused video pixel is lowered by multiplying it by a coefficient shown in a thick frame, and the gradation levels of video pixels located around the focused video pixel are increased by an amount corresponding to the multiplication by a coefficient according to a position.

The coefficients in the coefficient matrix of the filter in FIG. 10 are merely an example, and this is an example in which a difference "0.9" (=1−0.1) generated by the multiplication of the coefficient shown in the thick frame is distributed to 48 surrounding video pixels in accordance with a distance of a focused video pixel.

In FIG. 9, the correction circuit 223R executes the second to sixth processes and supplies the data signal Vid_R to the liquid crystal panel 100R.

Next, specific examples of the first to fifth processes will be described.

FIG. 11 is a diagram showing a relationship between a voltage applied to the liquid crystal element 120 and a gradation level in, for example, six panel pixels consecutive in the X direction among the panel pixels of which the gradation levels are designated by the pixel data configuring the R-component video data Va_R.

The vertical axis of a graph indicates a voltage applied to the liquid crystal element 120 and the gradation level thereof. Linearity between the voltage applied to the liquid crystal element 120 and the gradation level is actually different. In the drawing, a square indicates a panel pixel, and the density of the panel pixel indicates a transmittance when an applied voltage shown in the drawing is applied to the liquid crystal element 120.

Examples shown in right and left columns in FIG. 11 are both an example in which a dark panel pixel of which the gradation level is equal to or lower than a first threshold value Th1 and a dark panel pixel of which the gradation level is equal to or lower than a second threshold value Th2 are adjacent to each other.

Among these, the left column in the drawing shows a case where bright panel pixels Lp1 to Lp5, the number of which is larger than the number of dark panel pixels Dpa, are sequentially consecutive in the X direction with respect to the dark panel pixel Dpa. Although not shown in the drawing, a panel pixel for which a gradation level that is not equal to or lower than the first threshold value and is not equal to or higher than the second threshold value is designated is positioned on the left side of the dark panel pixel Dpa. For this reason, the dark panel pixel Dpa and the panel pixel on the left side do not configure a boundary.

In addition, the right column in the drawing shows a case where dark panel pixels Dp1 to Dp5, the number of which is larger than the number of bright panel pixels Lpa, are sequentially consecutive in the X direction with respect to the bright panel pixel Lpa. Although not shown in the drawing, a panel pixel for which a gradation level that is not equal to or lower than the first threshold value and is not equal to or higher than the second threshold value is designated is positioned on the left side of the bright panel pixel Lpa. For this reason, the bright panel pixel Lpa and the panel pixel on the left side do not configure a boundary.

FIG. 12 is a diagram showing a result of smoothing the gradation level designated by the pixel data shown in FIG. 11 using the low-pass filter 221R. In detail, the left column in FIG. 12 shows the results of smoothing the gradation levels shown in the left column in FIG. 11, and the right column in FIG. 12 shows the results of smoothing the gradation levels shown in the right column in FIG. 11.

As shown in the left column in FIG. 12, the gradation level of the dark panel pixel Dpa is processed to become brighter, and the bright panel pixels Lp1 to Lp5 are processed to become darker as they are closer to the dark panel pixel Dpa. This example is an example in which the gradation levels of the bright panel pixels Lp1 to Lp3 close to the dark panel pixel Dpa among the bright panel pixels Lp1 to Lp5 are processed to become dark.

As shown in the right column in FIG. 12, the gradation level of the bright panel pixel Lpa is processed to become darker, and the dark panel pixels Dp1 to Dp5 are processed to become brighter as they are closer to the bright panel pixel Lpa. This example is an example in which the gradation levels of the dark panel pixels Dp1 to Dp3 close to the bright panel pixel Lpa among the dark panel pixels Dp1 to Dp5 are processed to become bright.

In FIG. 12, a gradation level L1 is a gradation level after smoothing of the bright panel pixel Lp1 adjacent to the dark panel pixel Dpa. In detail, the gradation level L1 is a gradation level after smoothing of the bright panel pixel Lp1 when a boundary is configured with the dark panel pixel Dpa and the bright panel pixel Lp1, and the bright panel pixel Lp1 is followed by bright panel pixels of which the number is larger than the number of the dark panel pixels Dpa.

The gradation level L2 is a gradation level after smoothing of the bright panel pixel Lpa adjacent to the dark panel pixel Dp1. In detail, the gradation level L2 is a gradation level after smoothing of the bright panel pixel Lpa when a boundary is configured with by the bright panel pixel Lpa and the dark panel pixel Dp1, and the dark panel pixel Dp1 is followed by dark panel pixels of which the number is larger than the number of bright panel pixels Lpa.

The gradation level L2 is lower than the gradation level L1. This is because the dark panel pixel Dp1 is adjacent to the bright panel pixel Lpa, and the dark panel pixel Dp1 is followed by the dark panel pixels Dp2 onwards, and thus the effect of smoothing is strong.

A third threshold value Th3 is set in a range between equal to or lower than the gradation level L1 and higher than the gradation level L2. The gradation level L2 is not included in the range. The range is hatched in FIGS. 12 and 13.

Figure 13:
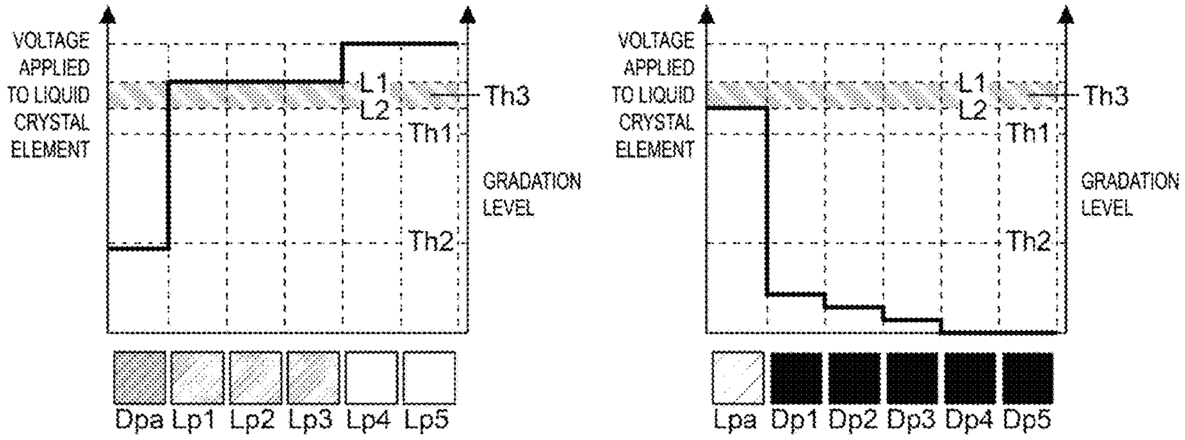
FIG. 13 is a diagram showing an example of a gradation level change.

FIG. 13 is a diagram showing an example of the third process, the fourth process, and the fifth process, and a processing target is the smoothed gradation level shown in FIG. 12.

Since the gradation level of the bright panel pixel Lp1 related to the boundary in the left column in FIG. 12 is determined to be equal to or higher than the third threshold value Th3 through the third process, the fourth process is executed. In detail, as the fourth process, as shown in the left column in FIG. 13, correction is performed such that the gradation level of the dark panel pixel Dpa related to the boundary is brought close to the second threshold value Th2, and the gradation levels of the bright panel pixel Lp1 related to the boundary and the bright panel pixels Lp2 and Lp3, which are processed such that the gradation levels thereof become dark by smoothing, are brought close to the first threshold value Th1.

On the other hand, since the gradation level of the bright panel pixel Lpa related to the boundary in the right column in FIG. 12 is determined to be equal to or higher than the third threshold value Th3 by the third process, the fourth process is not executed and the fifth process is executed. In detail, as the fifth process, as shown in the left column in FIG. 13, the smoothed gradation level is output as it is. That is, the left column in FIG. 13 is the same as the left column in FIG. 12.

A target of the fifth process is the bright panel pixel Lpa related to the boundary, and includes pixel data of panel pixels that are not detected as boundaries in the second process, in addition to the pixel data of the bright panel pixel Lpa and the dark panel pixels Dp1 to Dp3 of which the gradation levels are not equal to or higher than the third threshold value Th3.

According to such an embodiment, when bright panel pixels and dark panel pixels are adjacent to each other, when the number of bright panel pixels is larger than the number of dark panel pixels, domain correction for reducing a horizontal electric field between the bright panel pixels and the dark panel pixels is performed, whereas when the number of dark panel pixels is larger than the number of bright panel pixels, domain correction is not performed. Thus, it is possible to effectively curb a domain while suppressing black floating and display contradiction.

The first process is an example of "first correction", and the fourth process is an example of "second correction". In addition, the boundary between the dark panel pixel Dpa and the bright panel pixel Lp1 is an example of a "first boundary", and the boundary between the bright panel pixel Lpa and the dark panel pixel Dp1 is an example of a "second boundary".

The processing contents of the processing circuits 22R, 22G, and 22B in the embodiment can be conceptualized as a display control method. The processing circuits 22R, 22G, and 22B are different from each other only in color components of video data to be processed, and have the same processing contents. For this reason, the processing contents of the processing circuits 22R, 22G, and 22B will be described using the processing circuit 22R as a representative.

Figure 14:
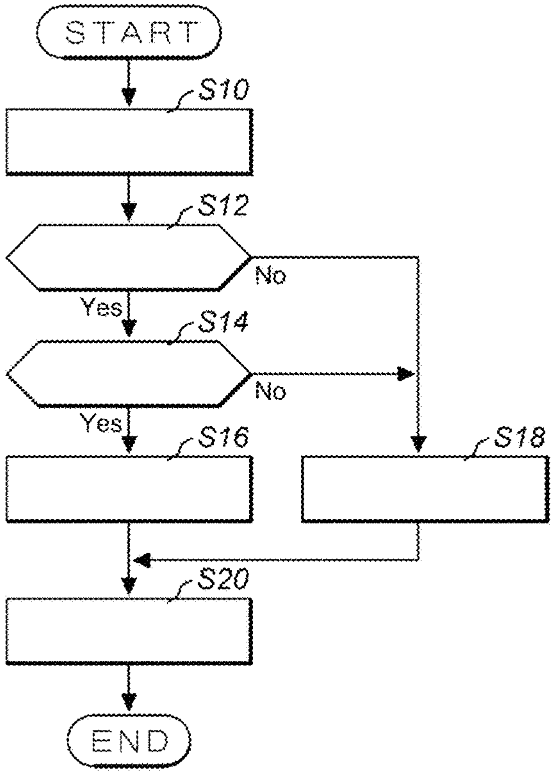
FIG. 14 is a flowchart showing an operation of the processing circuit.

FIG. 14 is a flowchart showing the display control method.

First, the processing circuit 22R accumulates the R-component video signal Va_R for one frame, for example, and smooths the gradation level of a pixel designated by pixel data (step S10).

Next, after the smoothing, the processing circuit 22R detects a boundary between a bright panel pixel having a gradation level equal to or higher than the first threshold value and a dark panel pixel having a gradation level equal to or lower than the second threshold value, which are adjacent to each other in the X direction or the Y direction (step S12). When the boundary is not detected (when the detection result in step S12 is "No"), the processing circuit 22R skips the processing procedure to step S18.

When the boundary is detected (when the detection result in step S12 is "Yes"), the processing circuit 22R further determines whether the gradation level of the bright panel pixel related to the detected boundary is equal to or higher than the third threshold value Th3 (step S14). When the gradation level of the bright panel pixel related to the detected boundary is not equal to or higher than the third threshold value Th3 (when the determination result of step S14 is "No"), the processing circuit 22R skips the processing procedure to step S18.

When the gradation level of the bright panel pixel related to the detected boundary is equal to or higher than the third threshold value Th3 (when the determination result in step S14 is "Yes"), the processing circuit 22R performs correction for bringing the gradation level of the bright panel pixel related to the detected boundary closer to the first threshold value and bringing the gradation level of the dark panel pixel related to the boundary closer to the second threshold value (step S16).

On the other hand, when the gradation level of the panel pixel not related to the boundary and the bright panel pixel related to the boundary are less than the third threshold value Th3, the processing circuit 22R outputs the smoothed gradation level as it is without performing correction for the panel pixel related to the boundary (step S18). When a plurality of boundaries are detected in one frame of the video data Vid_in, the processing circuit 22R executes the processes of steps S14, 16, and 18 for all the boundaries.

The processing circuit 22R converts the gradation level corrected in step S16 or the gradation level output as it is in step S18 into an analog signal Vid_R and supplies it signal to the liquid crystal panel 100R (step S20).

The processing circuit 22G also converts the video data Va_G into an analog data signal Vid_G through the same process and supplies it to the liquid crystal panel 100G. The processing circuit 22B also converts the video data Va_B into an analog data signal Vid_B through the same process and supplies it to the liquid crystal panel 100B.

For example, in the processing circuit 22R, the smoothing performed by the low-pass filter 221R and the correction process performed by the correction circuit 223R can be conceptualized as an integrated process without being distinguished from each other.

That is, the processing circuit 22R is configured to detect boundaries at which a bright panel pixel Lp, of which the gradation level of pixel data configuring video data Va_R is equal to or higher than the first gradation level Th1, and a dark panel pixel Dp, of which the gradation level is equal to or lower than the second gradation level Th2, are adjacent to each other. In the boundaries, when a first boundary at which dark panel pixels Dp and consecutive bright panel pixels Lp, the number of which is larger than the number of dark panel pixels Dp, are adjacent to each other, and a second boundary at which dark panel pixels Dp and consecutive bright panel pixels Lp, the number of which is smaller than the number of dark panel pixels Dp, are adjacent to each other are detected, the amount of correction for pixel data of the bright panel pixel Lp related to the first boundary is made smaller than the amount of correction for pixel data of the bright panel pixel Lp related to the second boundary, and the amount of correction for pixel data of the dark panel pixel Dp related to the first boundary is made larger than the amount of correction for pixel data of the dark panel pixel Dp related to the second boundary.

Although the method shown in FIG. 14 has been exemplified as the display control method for the processing circuit 22R, the processing circuit 22G, and the processing circuit 22B, the process of step S10 and the subsequent processes may be changed as follows. Although the case of the processing circuit 22R will be described as an example, the same process may be performed on the processing circuit 22G and the processing circuit 22B.

For the pixels smoothed in step S10, a boundary between a bright panel pixel having a gradation level higher than the third threshold value Th3 and a dark panel pixel having a gradation level lower than the third threshold value Th3 is detected, the bright panel pixel and the dark panel pixel being adjacent to each other in the X direction or the Y direction. When a boundary is not detected as a detection result, the processing circuit 22R skips the processing procedure and outputs the smoothed gradation level as it is.

When a boundary is detected, the processing circuit 22R determines whether bright pixels among the pixels configuring the boundary have a gradation level equal to or higher than the first threshold value Th1. When the bright pixels configuring the boundary have a gradation level equal to or higher than the first threshold value Th1, it is determined whether the dark pixels configuring the boundary have a gradation level equal to or lower than the second threshold value Th2. When the dark pixels configuring the boundary have a gradation level equal to or lower than the second threshold value Th2, the bright pixels configuring the boundary are corrected to be close to the first threshold value Th2, the dark pixels configuring the boundary are corrected to be close to the second threshold value 22R, and the processing circuit 22R outputs the corrected gradation levels. When the dark pixels configuring the boundary have a gradation level equal to or lower than the second threshold value Th2, the bright pixels configuring the boundary are corrected to be close to the first threshold value Th1, the dark pixels configuring the boundary are not corrected, and the processing circuit 22R outputs the corrected gradation levels.

When the bright pixels configuring the boundary have a gradation level lower than the first threshold value Th1, it is determined whether the dark pixels configuring the boundary have a gradation level equal to or lower than the second threshold value Th2. When the dark pixels configuring the boundary have a gradation level equal to or lower than the second threshold value Th2, the bright pixels configuring the boundary are not corrected, but the dark pixels configuring the boundary are corrected to be close to the second threshold value Th2, and the processing circuit 22R outputs the corrected gradation levels. When the dark pixels configuring the boundary have a gradation level higher than the second threshold value Th2, the processing circuit 22R skips the processing procedure and outputs the smoothed gradation level as it is.

Further, in the left column in FIG. 11 and the left column in FIG. 12, a case where the number of dark panel pixels Dp related to the boundary is one is shown, but two or more dark panel pixels Dp may be consecutive in the X direction or the Y direction. However, when k or more dark panel pixels Dp related to the boundary are consecutive, the number of correction targets of the bright panel pixels Lp related to the boundary may be (k+1) or more, which is larger than k. k is an integer equal to or greater than 2.

The liquid crystal panel 100 is not limited to a transmissive type and may be a reflective type.

From the embodiment illustrated above, the following aspects can be ascertained, for example.

A liquid crystal display device according to a first aspect of the present disclosure includes a liquid crystal panel including panel pixels, and a display control circuit configured to control the liquid crystal panel, in which video data includes pixel data corresponding to the panel pixels, and the pixel data designates gradation levels of the panel pixels. The display control circuit performs first correction on each piece of pixel data included in the video data based on a gradation level of gradation data of a panel pixel around each piece of pixel data, detects a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other, when there is a first boundary at which the gradation level designated by the pixel data of the bright panel pixel being a bright panel pixel related to the detected boundary and subjected to the first correction is equal to or higher than a third threshold value, in a first bright panel pixel and a first dark panel pixel adjacent to each other via the first boundary, performs second correction for bringing the gradation level designated by the pixel data of the first bright panel pixel subjected to the first correction close to the first threshold value and bringing the gradation level designated by the pixel data of the first dark panel pixel subjected to the first correction close to the second threshold value, and supplies a data signal corresponding to the corrected gradation level to the panel pixel.

According to the liquid crystal display device of the first aspect, it is possible to curb so-called black floating and curb occurrence of a domain.

In the liquid crystal display device according to a specific second aspect of the first aspect, the display control circuit reduces a difference between gradation levels designated by pixel data of adjacent panel pixels for each piece of pixel data included in the video data, as the first correction.

In the liquid crystal display device according to a specific third aspect of the first aspect, the boundary includes a second boundary in addition to the first boundary, and when dark panel pixels and bright panel pixels of which the number is larger than the number of the dark panel pixels are adjacent to each other at the first boundary, and dark panel pixels and bright panel pixels of which the number is smaller than the number of the dark panel pixels are adjacent to each other at the second boundary, the third threshold value is a value between a gradation level designated by pixel data of the bright panel pixels at the first boundary and a gradation level designated by pixel data of the bright panel pixels at the second boundary.

A liquid crystal display device according to a fourth aspect of the present disclosure includes a liquid crystal panel including panel pixels, and a display control circuit configured to control the liquid crystal panel, in which video data includes pixel data corresponding to the panel pixels, and the pixel data designates gradation levels of the panel pixels. The display control circuit detects a boundary at which a bright panel pixel, of which the gradation level designated by the pixel data included in the video data is equal to or higher than a first threshold value, and a dark panel pixel, of which the gradation level is equal to or lower than a second threshold value, are adjacent to each other, and when a first boundary and a second boundary are detected as the boundary, dark panel pixels and bright panel pixels, of which the number is larger than the number of the dark panel pixels, are adjacent to each other at the first boundary, and dark panel pixels and bright panel pixels, of which the number is smaller than the number of the dark panel pixels, are adjacent to each other at the second boundary, makes an amount of correction for the pixel data of the bright panel pixels related to the first boundary smaller than an amount of correction for the pixel data of the bright panel pixels related to the second boundary, and makes an amount of correction for the pixel data of the dark panel pixels related to the first boundary larger than an amount of correction for the pixel data of the dark panel pixels related to the second boundary.

A control method for a liquid crystal display device according to a fifth aspect of the present disclosure is a control method for the liquid crystal display device including a liquid crystal panel including panel pixels, and a display control circuit configured to control the liquid crystal panel, in which video data includes pixel data corresponding to the panel pixels, and the pixel data designates gradation levels of the panel pixels. The control method includes, by the display control circuit, performing first correction on each piece of pixel data included in the video data based on a gradation level of gradation data of a panel pixel around each piece of pixel data, detecting a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other, when there is a first boundary at which the gradation level designated by the pixel data of the bright panel pixel being a bright panel pixel related to the detected boundary and subjected to the first correction is equal to or higher than a third threshold value, in a first bright panel pixel and a first dark panel pixel adjacent to each other via the first boundary, performing second correction for bringing the gradation level designated by the pixel data of the first bright panel pixel subjected to the first correction close to the first threshold value and bringing the gradation level designated by the pixel data of the first dark panel pixel subjected to the first correction close to the second threshold value, and supplying a data signal corresponding to the corrected gradation level to the panel pixel.

An electronic apparatus according to a sixth aspect includes the liquid crystal display device according to any one of the first to fourth aspects.

What is claimed is:

1. A liquid crystal display device comprising:
- a liquid crystal panel including panel pixels; and
- a display control circuit configured to control the liquid crystal panel,
- wherein
- video data includes pixel data corresponding to the panel pixels, and the pixel data designates gradation levels of the panel pixels, and
- the display control circuit is configured to:
- perform first correction on each piece of pixel data included in the video data, based on a gradation level of gradation data of a panel pixel around each piece of pixel data;
- detect a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other;
- when there is a first boundary at which the gradation level designated by the pixel data of the bright panel pixel being a bright panel pixel related to the detected boundary and subjected to the first correction is equal to or higher than a third threshold value,
- in a first bright panel pixel and a first dark panel pixel that are at the first boundary and that are adjacent to each other via the first boundary, the gradation level of the first bright panel pixel having been reduced during the first correction, the gradation level of the first dark panel pixel having been increased during the first correction,
- perform second correction for bringing the gradation level designated by the pixel data of the first bright panel pixel subjected to the first correction closer to the first threshold value by further reducing the gradation level of the first bright panel pixel and bringing the gradation level designated by the pixel data of the first dark panel pixel subjected to the first correction closer to the second threshold value by further increasing the gradation level of the first dark panel pixel; and
- supply a data signal corresponding to the corrected gradation level to the panel pixel.

2. The liquid crystal display device according to claim 1, wherein the display control circuit is configured to reduce a difference between gradation levels designated by pixel data of adjacent panel pixels for each piece of pixel data included in the video data, as the first correction.

3. The liquid crystal display device according to claim 1, wherein
- the boundary includes a second boundary in addition to the first boundary, and
- when dark panel pixels and bright panel pixels of which the number is larger than the number of the dark panel pixels are adjacent to each other at the first boundary, and dark panel pixels and bright panel pixels of which the number is smaller than the number of the dark panel pixels are adjacent to each other at the second boundary, the third threshold value is a value between a gradation level designated by pixel data of the bright panel pixels at the first boundary and a gradation level designated by pixel data of the bright panel pixels at the second boundary.

4. A liquid crystal display device comprising:

a liquid crystal panel including panel pixels; and a display control circuit configured to control the liquid crystal panel, wherein video data includes pixel data corresponding to the panel pixels, and the pixel data designates gradation levels of the panel pixels, and the display control circuit is configured to:

detect a boundary at which a bright panel pixel, of which the gradation level designated by the pixel data included in the video data is equal to or higher than a first threshold value, and a dark panel pixel, of which the gradation level is equal to or lower than a second threshold value, are adjacent to each other; and when a first boundary and a second boundary are detected as the boundary, the first boundary being between a bright panel pixel and a dark panel pixel that are immediately adjacent to each other, the first boundary being between a bright panel pixel and a dark panel pixel that are immediately adjacent to each other, dark panel pixels and bright panel pixels, of which the number is larger than the number of the dark panel pixels, are adjacent to each other at the first boundary, and dark panel pixels and bright panel pixels, of which the number is smaller than the number of the dark panel pixels, are adjacent to each other at the second boundary, make an amount of correction for the pixel data of the bright panel pixels related to the first boundary smaller than an amount of correction for the pixel data of the bright panel pixels related to the second boundary, and make an amount of correction for the pixel data of the dark panel pixels related to the first boundary larger than an amount of correction for the pixel data of the dark panel pixels related to the second boundary.

5. A control method for a liquid crystal display device, the liquid crystal display device including a liquid crystal panel including panel pixels, and a display control circuit configured to control the liquid crystal panel, in which video data includes pixel data corresponding to the panel pixels, and the pixel data designates gradation levels of the panel pixels, the control method comprising:

by the display control circuit, performing first correction on each piece of pixel data included in the video data based on a gradation level of gradation data of a panel pixel around each piece of pixel data;

detecting a boundary at which a bright panel pixel, of which the gradation level designated by the pixel data subjected to the first correction is equal to or higher than a first threshold value, and a dark panel pixel, of which the gradation level is equal to or lower than a second threshold value, are adjacent to each other;

when there is a first boundary at which the gradation level designated by the pixel data of the bright panel pixel being a bright panel pixel related to the detected boundary and subjected to the first correction is equal to or higher than a third threshold value, in a first bright panel pixel and a first dark panel pixel that are at the first boundary and that are adjacent to each other via the first boundary, the gradation level of the first bright panel pixel having been reduced during the first correction, the gradation level of the first dark panel pixel having been increased during the first correction, performing second correction for bringing the gradation level designated by the pixel data of the first bright panel pixel subjected to the first correction closer to the first threshold value by further reducing the gradation level of the first bright panel pixel and bringing the gradation level designated by the pixel data of the first dark panel pixel subjected to the first correction closer to the second threshold value by further increasing the gradation level of the first dark panel pixel; and supplying a data signal corresponding to the corrected gradation level to the panel pixel.

6. An electronic apparatus comprising the liquid crystal display device according to claim 1.

* * * * *